(No Model.)
C. E. SKINNER & J. STEWART.
Hand Truck.
No. 233,292. Patented Oct. 12, 1880.
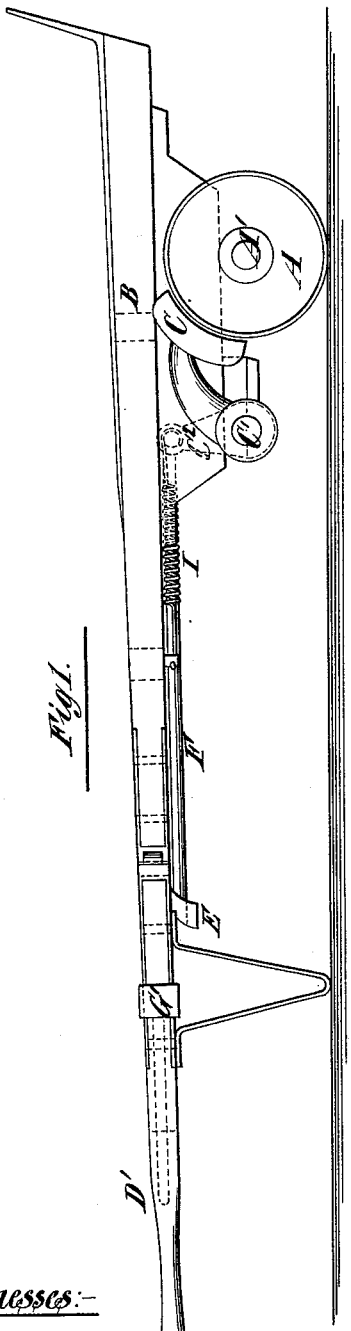
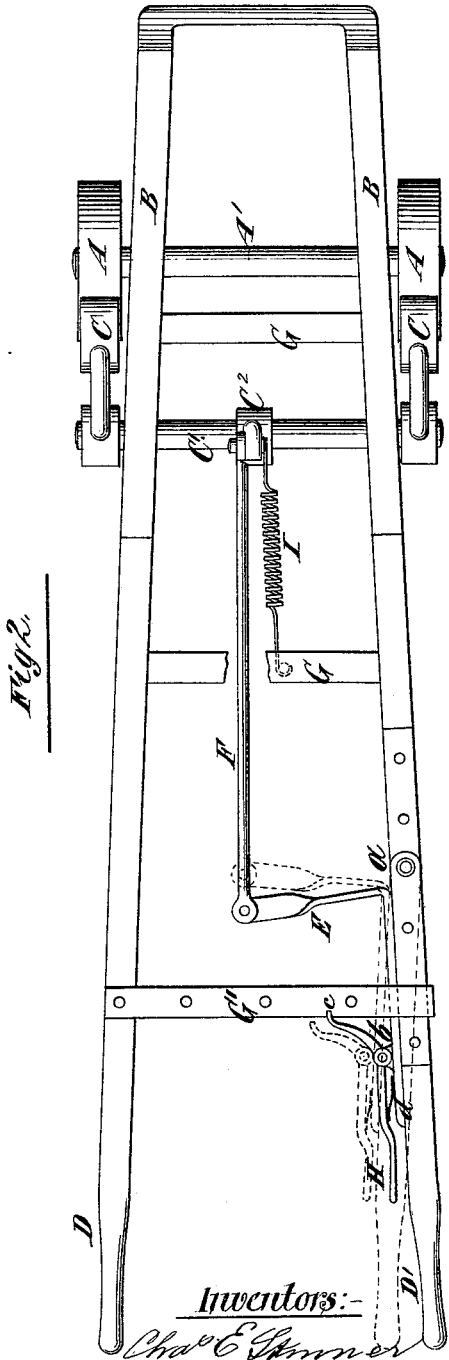

UNITED STATES PATENT OFFICE.

CHARLES E. SKINNER AND JOHN STEWART, OF YONKERS, NEW YORK.

HAND-TRUCK.

SPECIFICATION forming part of Letters Patent No. 233,292, dated October 12, 1880.

Application filed August 23, 1880. (No model.)

*To all whom it may concern:*

Be it known that we, CHARLES E. SKINNER and JOHN STEWART, both of Yonkers, in the county of Westchester and State of New York, have invented certain new and useful Improvements in Hand-Trucks, of which the following is a specification.

Our invention relates to the hand-trucks in common use in stores and other places for handling and moving merchandise; and its object is to provide, in a novel and simple manner, for applying a brake to one or both wheels of such a truck while both hands of the person operating the same are applied to the handles.

To this end the invention consists in the combination, with the side frames and wheels of a hand-truck, of a brake or brakes, a rock-shaft, to which said brake or brakes are attached, handles for said side frames, one of which is pivoted to the side frame so as to permit of its being moved inward or outward, as a lever, toward or from the other handle, and mechanism connecting said pivoted handle or lever and said rock-shaft, so that by moving said handle or lever said rock-shaft is oscillated and said brake or brakes are applied to the wheels. We also preferably employ a latch or slot for preventing the said pivoted handle from being accidentally moved to apply the brake or brakes, and a spring for raising the brake or brakes from the wheels when not otherwise actuated.

In the accompanying drawings, Figure 1 represents a side view, and Fig. 2 a plan, of a truck embodying our invention.

A designates the wheels, and A' the axle, of the truck; and B designates the side frames, which are supported upon said axle in the ordinary way.

C designates brakes adapted to be applied to the wheels A for the purpose of stopping the truck, and which are fixed to a rock-shaft, C', supported in suitable bearings in or attached to the side frames, B. C² designates an arm or lever, also fixed upon said shaft, and adapted to be moved back and forth to rock the shaft and apply the said brakes.

D D' designate handles, the former of which is formed upon one of the side frames, while the latter is pivoted to the other side frame at *a*, so that it is free to move inward or outward toward or from the other handle and to serve as a lever.

E designates a bracket or arm projecting inward from the pivoted handle D', and connected, by means of a link or rod, F, with the arm or lever C² upon the rock-shaft C'.

It will be understood that by moving the pivoted handle D' into the position shown in Fig. 2 in dotted outline the rock-shaft C' will be oscillated and the brakes C caused to press against the wheels to stop the truck.

The side frames, B, are connected by the ordinary stretchers or cross-bars G, and also by a cross-bar or brace, G', which embraces the pivoted handle D' and forms a stop to its outward movement.

When the handles of the truck are grasped and lifted with a heavy load the natural tendency of the handles would be to move toward each other, if it were possible, and in order to prevent the handle D' from being moved inward thus accidentally and the brakes from being applied, we employ a latch or stop, H, pivoted at *b* to the handle D' and held in engagement with a notch, *c*, in the cross-bar or stretcher, G', by a spring, *d*, applied behind it. When it is desired to apply the brakes the hand is slipped down on the handle D' sufficiently far to grasp and press upon the latch or stop to move it out of engagement with the notch *c*, whereupon the pivoted handle may be readily moved inward.

A spring, I, is preferably employed to keep the brakes out of engagement with the wheels when not otherwise actuated.

By our invention we provide for much more conveniently handling and controlling the hand-trucks commonly used, especially when used to move or carry heavy loads down an inclined plane, as over the gang-plank of a vessel.

What we claim as our invention, and desire to secure by Letters Patent, is—

1. The combination, with the side frames and wheels of a hand-truck, of a brake or brakes, and a rock-shaft, to which said brake or brakes are attached, handles for said side frames, one of which is pivoted to the side frame so as to permit of its being moved inward or outward, as a lever, toward or from the other handle, and mechanism connecting said pivoted handle or lever and said rock-shaft, so that by moving said handle or lever said rock-shaft is oscillated and said brake or brakes are applied, substantially as specified.

2. The combination, with the wheels A, the brakes C, the pivoted handle or lever D', mechanism connecting said brakes and handle, so that by moving said handle or lever inward said brakes are applied, of a latch or stop for precluding the accidental inward movement of said handle or lever, substantially as specified.

3. The combination of the wheels A, the side frames, B, the brakes C, rock-shaft C', and arm C², the fixed handle D, the pivoted handle or lever D', the arm or bracket E, and the link F, all substantially as specified.

CHAS. E. SKINNER.
JOHN STEWART.

Witnesses:
A. C. MOTT,
I. G. DOWNING.